United States Patent Office 3,133,316
Patented May 19, 1964

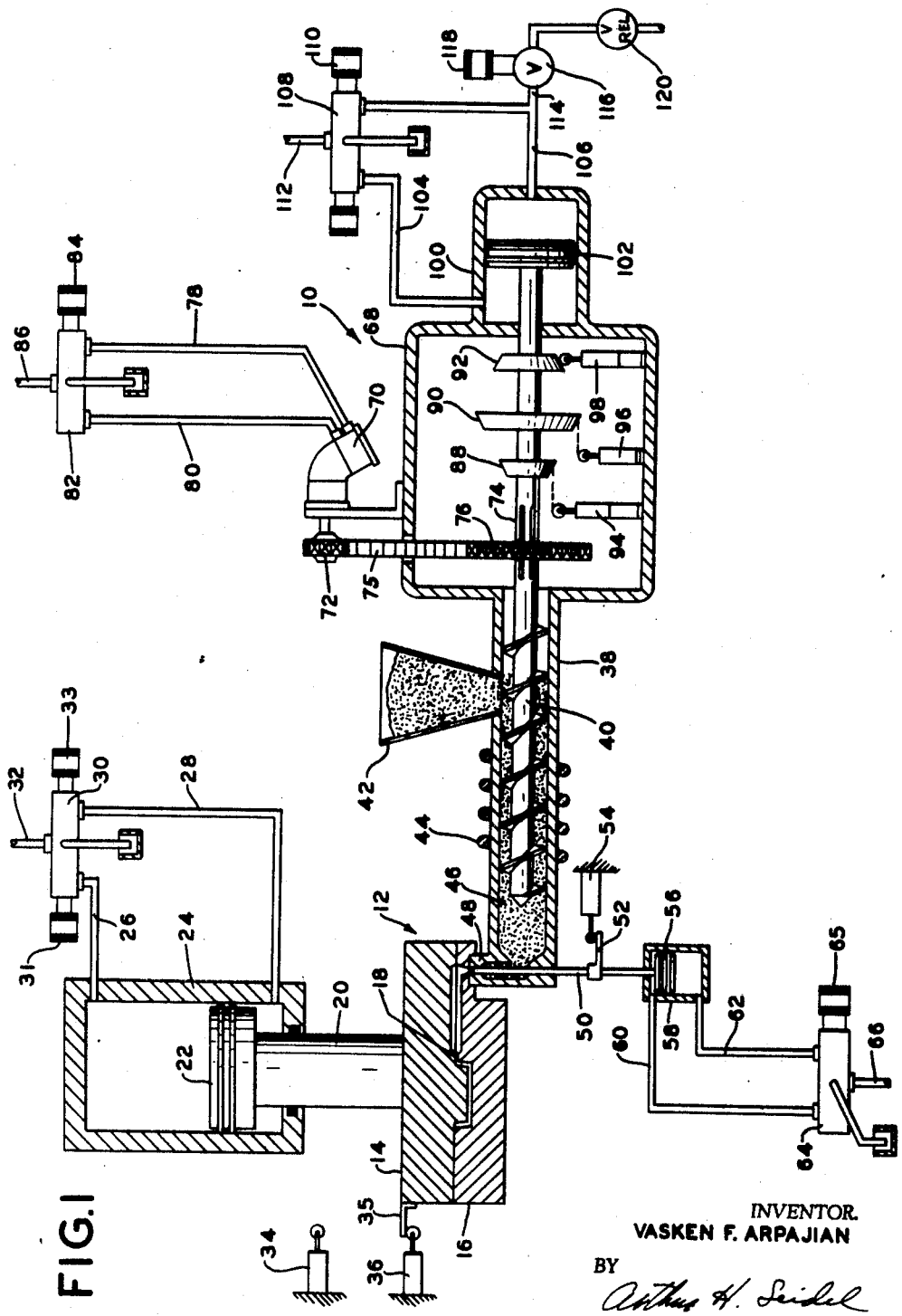

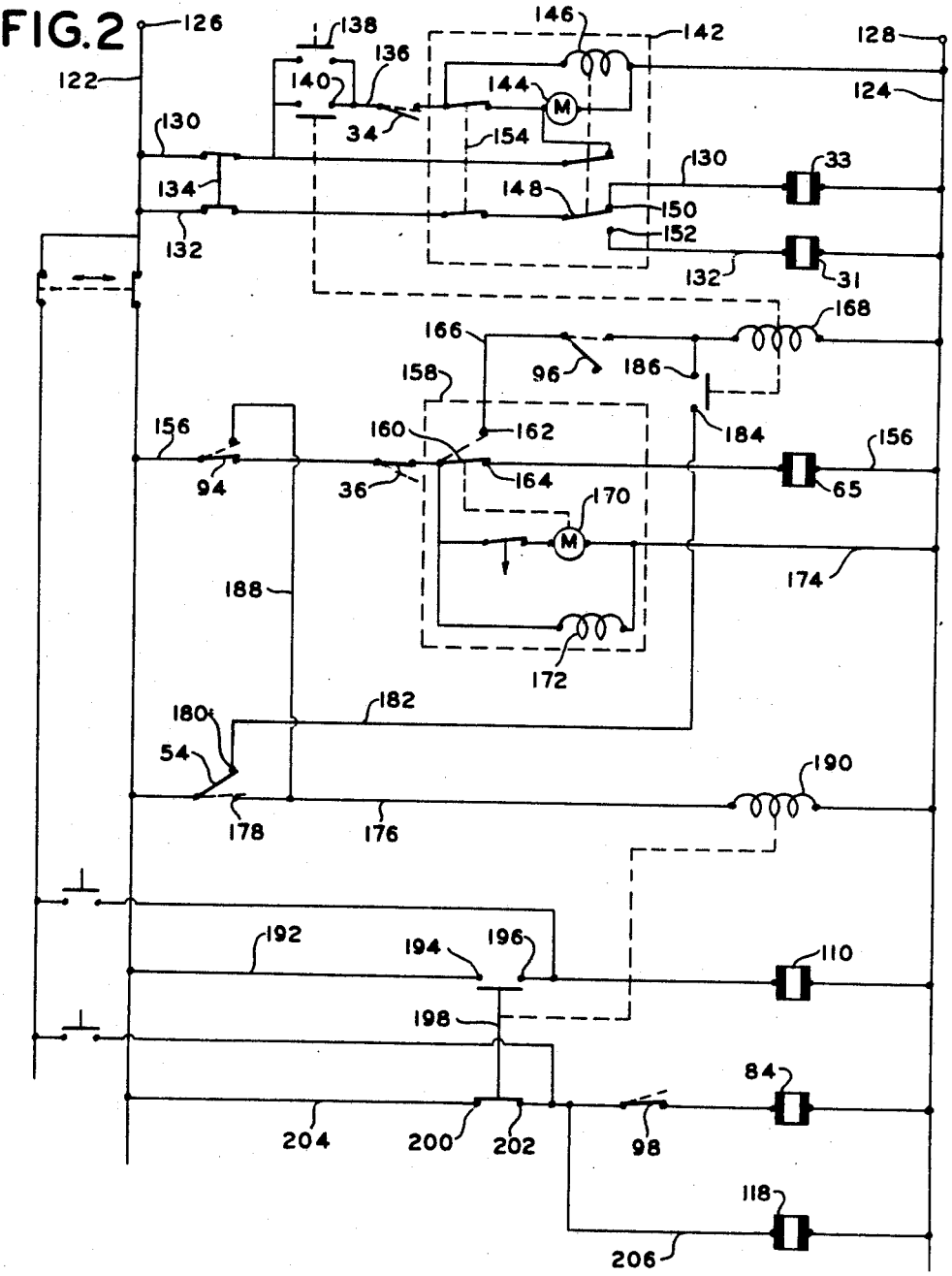

3,133,316
MOLDING APPARATUS
Vasken F. Arpajian, Huntington Valley, Pa., assignor, by mesne assignments, to Pennsalt Chemicals Corporation, Philadelphia, Pa., a corporation of Pennsylvania
Filed Aug. 7, 1961, Ser. No. 129,690
11 Claims. (Cl. 18—30)

This invention relates to a molding apparatus, and more particularly to a molding apparatus having means for delivering preplasticized material to a mold in response to the closing of the mold and the opening of the injection nozzle.

A wide variety of machines for plasticizing plastic materials have been proposed heretofore. Preplasticizer units have been proposed wherein the plastic material is first conditioned in a unit and then delivered to a transfer cylinder from which the material is injected into the mold cavity. Another type of a preplasticizer unit is disclosed in Patent 2,734,226 wherein the plastic material is preplasticized within the transfer cylinder itself. The preplasticizer unit of the present invention is of the type disclosed in said patent.

The molding machine in said patent suffers from several disadvantages which the present invention overcomes. In using the machine of said patent, it is possible for the mold halves to be separated while the "shot" of material is being injected into the mold cavity at a pressure of approximately 20,000 p.s.i. Such a condition is extremely dangerous to personnel in the immediate area of the machine. Also, the machine in said patent does not provide for stopping of the machine or preventing the closing of the mold in the event that a "short shot" is made.

The present invention overcomes the above and other disadvantages of the machine shown in the above-mentioned patent by initiating the return movement of the screw in response to the opening of the injection nozzle. The injection nozzle of the present invention cannot open until the molds are closed. Accordingly, the danger to personnel in the immediate area of the machine of the present invention is substantially eliminated. If a "short shot" is made with the machine of the present invention, the mold will remain open on the next cycle thereby indicating that a "short shot" was made.

In the machine of Patent 2,734,226 the length of travel of the screw in a direction away from the injection nozzle is a fixed distance. After the screw has traveled through such fixed distance, it is immediately returned in a direction toward the injection nozzle. On the contrary, the machine of the present invention includes a reciprocating screw which has no fixed distance of travel as such. Instead, the reciprocation of the screw of the present invention is controlled mainly by the closing of the mold and the opening of the injection nozzle. When these two conditions exist, the rearward travel of the screw is halted and reversed so that the screw moves in a direction toward the injection nozzle. In the event that one or both of these conditions does not exist, the screw, after a predetermined distance of travel, will cause actuation of a stop limit switch which holds the reciprocation of the screw until both of the above-mentioned conditions exist. Thereafter, the screw will be reciprocated in a direction toward the injection nozzle.

It is an object of the present invention to provide a novel molding apparatus.

It is another object of the present invention to provide a novel molding apparatus which prevents injection of a "shot" until the mold is closed and the injection nozzle is open.

It is another object of the present invention to provide a novel molding apparatus having a rotating and reciprocally mounted screw for delivering a predetermined amount of preplasticized material to a mold, with the reciprocation of the screw being responsive to the opening and closing of the mold.

It is still another object of the present invention to provide a completely automatic injection molding apparatus wherein the delivery of a "shot" of plastic material to a mold is responsive to the closing of the mold.

It is a still further object of the present invention to provide an automatic molding apparatus wherein a mold will remain open if a "short shot" is made.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a longitudinal sectional view of the molding apparatus of the present invention with a portion thereof being shown schematically.

FIGURE 2 is a schematic illustration of the wiring diagram for the apparatus illustrated in FIGURE 1.

Referring to the drawings in detail, wherein like numerals indicate like elements, there is shown in FIGURE 1 a molding apparatus in accordance with the present invention designated generally as 10.

The molding apparatus 10 includes a mold 12 having an upper half 14 and a lower half 16. The mold halves 14 and 16 are appropriately sculptured so as to provide a mold cavity 18 in any conventional manner. The mold half 14 is mounted for reciprocal movement toward and away from the mold half 16.

The reciprocatory movement of the mold half 14 is effected by means of a piston rod 20. One end of the piston rod 20 is secured to the mold half 14 and the other end of the piston rod 20 is provided with a piston 22. The piston 22 is disposed within a cylinder 24. The piston rod 20 extends through a hole in one wall of the cylinder 24 and seal means are provided around said hole.

Conduits 26 and 28 communicate with opposite ends of the cylinder 24. The conduits 26 and 28 are connected to a valve 30. Valve 30 is a sliding spool supply and exhaust valve which is commercially available. The spool within the valve is reciprocated to supply fluid from inlet conduit 32 to either the conduit 26 or to conduit 28 in response to solenoids 31 and 33 on opposite ends of the spool.

The apparatus 10 of the present invention includes a mold open switch 34 and a mold closed switch 36. The switches 34 and 36 are selectively operable by means of an arm 35 on the mold half 14. The significance of the switches 34 and 36 will be made clear hereinafter in a discussion of the wiring diagram illustrated in FIGURE 2.

The material which is to be injected into the mold cavity 18 is measured and preplasticized within a barrel or transfer cylinder 38. A screw 40 having ribs helically disposed thereon is rotatably and reciprocably mounted within the transfer cylinder 38. The material to be plasticized and injected into the mold cavity 18 is fed into the transfer cylinder 38 from a hopper 42. The throat of the hopper 42 is in communication with the interior of the transfer cylinder 38 at the point illustrated in FIGURE 1.

The cylinder 38 is provided with a heating means to increase temperature of the material while it is being worked by the screw 40 so as to render the material in a preplasticized state. The material from the hopper 42 is fed by the rotation of the screw 40 into the accumulation zone 46 which is located at one end of the transfer cylinder 38 adjacent the mold 12. The accumulation zone 46 is separated from the mold cavity 18 by a nozzle 48.

Flow through the nozzle 48 is controlled by a nozzle shutoff pin 50 which is reciprocably disposed within the bore of the nozzle 48 and extends in a direction substantially perpendicular to the longitudinal axis of the transfer cylinder 38. Approximately one-half of the pin 50 extends away from the longitudinal axis of the transfer cylinder 38 and nozzle 48. On such portion, an arm 52 is provided for cooperation with a nozzle limit switch 54. When the arm 52 actuates the nozzle switch 54, the pin 50 shuts off flow between the accumulation zone 46 and the mold cavity 18.

The end of the pin 50 remote from the nozzle 48 is provided with a piston 56 disposed within a cylinder 58. Conduits 60 and 62 communicate with opposite ends of the cylinder 58. The ends of the conduits 60 and 62 remote from the cylinder 58 are connected to a supply and exhaust valve 64. A movable valve element within the valve 64 is operated by means of a solenoid 65 so as to control flow from a supply conduit 66 to the conduits 60 and 62 and the atmosphere.

A housing 68 extends from the righthand end of the transfer cylinder 38 in FIGURE 1. A hydraulic motor 70 is supported by the housing 68. The motor 70 is provided with an output shaft having a sprocket 72 fixedly secured thereto. The sprocket 72 is meshingly engaged with and drives a chain 75. The chain 75 extends around a sprocket 76. The sprocket 76 is mounted on a splined portion 74 on the screw 40. It will be understood that suitable splined bushings are provided for the sprocket 76 so that such sprocket 76 is maintained in meshing engagement with the chain 75.

Motivation fluid is supplied to the motor 70 by means of conduits 78 and 80. Conduits 78 and 80 are connected to a valve 82 wherein a movable element is actuated by solenoid 84. Valve 82 is a supply and exhaust valve and the movable element therein controls flow from a supply conduit 86 to the conduits 78, 80, and the atmosphere in response to actuation of the solenoid 84.

The screw 40 is provided with a plurality of longitudinally spaced cams 88, 90, and 92 within the housing 68. The cam 88 is fixedly secured to the screw 40 and is operatively disposed so as to actuate switch 94 under predetermined conditions to be made clear hereinafter. Cam 90 is fixedly secured to the screw 40 and is disposed to actuate switch 96 under predetermined conditions to be made clear hereinafter. Likewise, cam 92 is fixedly secured to the screw 40 and is disposed to actuate safety limit switch 98 under conditions which will be more fully described hereinafter.

A cylinder 100 extends from the housing 68. A piston 102 fixedly secured to the righthand end of the screw 40 is disposed within the cylinder 100. Conduits 104 and 106 are in communication with opposite ends of the cylinder 100. The conduits 104 and 106 are connected to a supply and exhaust valve 108. A movable element within the valve 108 is operated in response to solenoid 110 so as to control flow of motivation fluid from the supply conduit 112 to conduits 104 and 106 and the atmosphere.

A conduit 114 extends between conduit 106 and a valve 116. The valve 116 is provided with a movable element operated in response to solenoid 118. The output side of valve 116 is in communication with the inlet side of a pressure relief valve 120.

The remaining elements of the present invention are more clearly illustrated in FIGURE 2. As shown in FIGURE 2, a wiring diagram is provided which includes wires 122 and 124 disposed in parallel and extending from terminals 126 and 128 respectively. The terminals 126 and 128 are adapted to be connected to a source of electrical potential.

Wires 130 and 132 extend in parallel between the wires 122 and 124. A selector switch 134 is provided so that both the contacts in wire 130 and the contacts in wire 132 are bridged in the on position. When the contacts in wires 130 and 132 are bridged by the switch element, the apparatus of the present invention is disposed for automatic operation. When the contacts in wires 130 and 132 are not bridged, the apparatus of the present invention is set for manual operation.

A wire 136 extends from the wire 130 to the wire 124 as illustrated in FIGURE 2. A cycle start pushbutton 138 is disposed in the wire 136 in parallel with switch contacts 140. The significance of the switch contacts 140 will be made clear hereinafter. It will be noted that solenoid 33 for the valve 30 is disposed in wire 130 and that solenoid 31 for the valve 30 is disposed in wire 132. Also, it will be noted that the mold open limit switch 34 is disposed in wire 136.

A mold timer 142 is connected across the wires 130, 132 and 136. A timer motor 144 is disposed in wire 136 in parallel with a clutch coil 146. A switch element in wire 132 is capable of alternatively bridging contact 150 in wire 130 or contact 152 in wire 132. A double pole switch 154 extends across wires 132 and 136 within the timer 142.

A wire 156 extends across wires 122 and 124. Limit switch 94 adapted to be actuated by the cam 88 is disposed within wire 156 and is actuated when the accumulation zone 46 is empty thereby indicating that a "short shot" was made. Switch 36, which is actuated when the mold 12 is closed, is disposed within wire 156 between switch 94 and a nozzle timer 158. It will be noted that solenoid 65 for valve 64 is disposed within wire 156.

The nozzle timer 158 includes a switching element in wire 156 which is adapted to bridge either contact 162 or contact 164. Contact 162 is located at one end of wire 166. The other end of wire 166 is connected to wire 124. The injection limit switch 96 and relay coil 168 are disposed in wire 166. The relay coil 168 is adapted to selectively bridge the contacts 140 as will be made clear hereinafter.

The nozzle timer 158 includes a motor 170 in parallel with a clutch coil 172 which are disposed in a wire 174. The wire 174 extends from the base terminal of the switch element 160 to wire 124.

A wire 176 extends between wires 122 and 124. The nozzle closed limit switch 54 is disposed in wire 176 and includes a switching element capable of alternatively bridging contact 178 in wire 176 or contact 180. Contact 180 is located at one end of wire 182. The other end of wire 182 is connected to wire 166 intermediate switch 96 and relay 168. Wire 182 includes contacts 184 and 186 which are adapted to be bridged in response to the relay coil 168 as will be made clear hereinafter. A wire 188 extends from wire 176 to one terminal of switch 94. Thus, current may flow from wire 156 to wire 176 under conditions to be made clear hereinafter.

A relay coil 190 is disposed in wire 176. A wire 192 having solenoid 110 disposed therein extends between wires 122 and 124. Contacts 194 and 196 are disposed in wire 192. These contacts are adapted to be bridged by a movable element of switch 198 which is responsive to the relay coil 190.

The movable element of switch 198 is alternatively bridging the contacts 194 and 196 or contacts 200 and 202 which are disposed in wire 204. Wire 204 extends between the wires 122 and 124. The safety stop switch 98 and solenoid 84 are disposed within wire 204. A wire 206 extends from wire 124 to wire 204 at a point intermediate contact 202 and switch 98. Solenoid 118 is disposed in wire 206.

The operation of the apparatus 10 is as follows:

Terminals 126 and 128 are connected to a source of potential, selector switch 134 is disposed in the position for automatic operation as illustrated in FIGURE 2, and the cycle start pushbutton switch 138 is closed. The closing of the switch 138 is only momentary so as to provide a pulse to energize the timer 142. Pulsing of the timer 142 causes the switch element 148 to bridge contact 152 thereby energizing solenoid 31 which causes fluid to be directed into the cylinder 24 above the piston 22 so as to close the mold 12. Thereafter, the movable element of switch 34 moves to the solid line position shown in FIGURE 2 thereby breaking the contacts in wire 136. When the mold 12 is closed, the movable element of the switch 36 is in the solid line position illustrated in FIGURE 2 thereby energizing the nozzle timer 158 and solenoid 65.

When the solenoid 65 is energized, fluid is directed from conduit 66 through conduit 60 into the cylinder 58. Thereafter, the nozzle pin 50 moves to an open disposition. As the nozzle pin 50 moves to an open disposition, the movable element of switch 54 moves to the phantom position illustrated in FIGURE 2 thereby energizing relay coil 190. Energization of relay coil 190 causes the switch 198 to bridge the contacts 194 and 196 thereby energizing solenoid 110.

Eenergization of solenoid 110 causes motivation fluid to flow from conduit 112 through conduit 106 into cylinder 100 thereby advancing the screw 40 to inject preplasticized material from accumulation zone 46 into the mold cavity 18. If the mold cavity 18 is properly filled, the screw 40 will have advanced to a position so that cam 90 energizes switch 96 so that the movable element of switch 96 moves to the phantom position illustrated in FIGURE 2 thereby bridging the contacts in wire 166. When the nozzle timer 158 times out, the movable element 160 moves to the phantom position illustrated in FIGURE 2 thereby energizing the relay coil 168.

If the screw 40 has not advanced sufficiently so that cam 90 energizes switch 96, relay coil 168 will not be energized when nozzle timer 158 times out. Unless relay coil 168 is energized, contacts 140 in wire 136 will not be bridged. This will prevent the mold timer 142 from reenergizing for the subsequent cycle. Accordingly, the mold halves 14 and 16 will remain open, thereby indicating that a "short shot" was made.

If the screw 40 advances more than the full extent of its predetermined stroke during injection, cam 88 will energize the empty limit switch 94 so that the movable element of switch 94 moves to the phantom position shown in FIGURE 2. Thus, flow of current through wire 188 and 176 will prevent relay coil 190 from deenergizing. Also, relay coil 168 will be prevented from energizing which, in turn, will prevent the mold timer 142 from reenergizing for the subsequent cycle in the same manner as described above.

When the nozzle timer 158 times out, the switch element 160 moves to the phantom position as described above thereby deenergizing solenoid 65. When solenoid 64 is deenergized, motivation fluid flows from conduit 66 through conduit 62 thereby advancing nozzle shutoff pin 50 to a closed disposition. When the pin 50 is in a closed disposition, arm 52 contacts nozzle closed limit switch 54. As a result thereof, the following conditions occur simultaneously:

(a) Relay coil 190 is deenergized thereby causing switch 198 to move to a disposition whereby contacts 194 and 196 are not bridged thereby. When these contacts are not bridged, solenoid 110 is deenergized thereby interrupting the flow of motivation fluid from valve 108 through conduit 106 to cylinder 100.

(b) Contacts 200 and 202 are bridged so that solenoid 118 is energized to permit flow of motivation fluid from conduit 106 through conduit 114 to the pressure relief valve 120.

(c) Solenoid 84 is energized since the switch element of switch 98 is in the solid line position as illustrated in FIGURE 2. When solenoid 84 is energized, motivation fluid flows from conduit 86 through the valve 82 thereby actuating the motor 70 which in turn causes the screw 40 to rotate as a result of the meshed engagement of the sprockets 72 and 76 with the chain 75. The screw 40 will rotate thereby feeding extruded plastic into the accumulation zone 46 which in turn causes the screw 40 to reciprocate to the right in FIGURE 1 against an adjustable hydraulic resistance as determined by the setting on the relief valve 120.

(d) Relay coil 168 will be energized by the flow of current through wires 156 and 166 thereby bridging the contacts 140.

The screw 40 will continue rotating and reciprocating to the right in FIGURE 1 until it is thrust forward to inject another predetermined amount of plasticized material into the mold cavity 18. When the mold timer 142 times out, solenoid 31 is deenergized by movement of the switch element 148 which then bridges contact 150 thereby energizing solenoid 33. At this point, motivation fluid is supplied from conduit 32 through conduit 28 thereby raising the mold half 14. The molded article is ejected and the fully open mold 12 results in arm 35 contacting switch 34 thereby moving the movable element of switch 34 to the phantom position illustrated in FIGURE 2.

Since contacts 140 have been bridged as set forth above, and since the movable switch element of switch 34 is in the phantom position shown in FIGURE 2, the mold timer 142 will be reenergized to close the mold and repeat the cycle set forth above. The repetition of the cycle set forth above results in a closing of the mold 12 and an opening of the nozzle 48, which in turn will halt the reciprocation of the screw 40 to the right in FIGURE 1 as described above and cause the screw 40 to return to the left thereby injecting another "shot" into the mold cavity 18. Thus, it will be seen that the return stroke of the screw 40 for injecting a "shot" into the mold cavity 18 is responsive to closing of the mold 12 and opening of the nozzle 48. In the event that the mold 12 should not close or the nozzle 48 is not opened, the screw 40 will continue reciprocating to the right until cam 92 contacts safety limit switch 98.

When safety limit switch 98 is actuated, the movable switch element is activated to the phantom position shown in FIGURE 2 thereby deactivating the solenoid 84. When the solenoid 84 is deactivated, the motor 70 halts and the screw 40 ceases to rotate. When the screw 40 ceases to rotate, no additional material is fed to the accumulation zone 46, therefore the reciprocation of the screw 40 to the right is halted. The respective elements of the present invention remain in this condition until the defect which prevented the mold 12 from properly closing or the nozzle 48 from opening is ascertained and eliminated.

Thus, it will be seen that the operation of the apparatus of the present invention includes a repetitive cycle of reciprocation of a rotating screw in response to the opening and closing of the mold and injection nozzle. If the mold 12 does not close properly or the nozzle 48 does not open properly, the safety limit switch 98 will be energized so as to halt the rotative and reciprocatory motion of the screw 40. If cam 88 energizes switch 94, the automatic sequence of the apparatus 10 will be stopped during the succeeding cycle since the mold 12 will not close. The cam 88 will energize switch 94 in response to any one or a combination of the following: hopper 42 is empty; insufficient material was extruded into accumulation zone 46 within the allotted extruding time for the particular cycle being run; flashing of the mold 12, or loss of plastic material due to other leakages.

It will be noted that the disposition of the nozzle 48 with the reciprocably disposed pin 50 extending into the bore of the nozzle provides a nozzle which is self-cleaning. In operation of the present invention, it is desirable to adjust the timers 142 and 158 as well as the speed of rotation of the screw 40 so that sufficient material will be accumulated in the accumulation zone 46 plus a cushion reserve.

The present invention may be embodied in other specific forms without departing from the spirit or essential attributes thereof and, accordingly, reference should be made to the appended claims, rather than to the foregoing specification as indicating the scope of the invention.

I claim:

1. A molding apparatus comprising a separable mold having a mold cavity, a transfer cylinder, a valve injection nozzle between and in communication with said mold cavity and said transfer cylinder, means for selectively rotating a screw within said cylinder, means for causing said screw to move in said cylinder in a direction away from said nozzle, means for reversing the direction of movement of said screw in response to said mold being properly closed and said nozzle being opened, whereby material may be injected into the mold cavity from said transfer cylinder by said screw, and means for preventing the closing of the mold during the next cycle of operation in response to movement of said screw in a direction toward said nozzle beyond a predetermined point.

2. A molding apparatus in accordance with claim 1 including a safety limit switch, means on said screw for actuating said limit switch to stop the rotation of said screw.

3. Molding apparatus in accordance with claim 1 wherein said reversing means includes a switch responsive to the closing of the mold, said switch actuating the opening movement of a valving element in said nozzle, and the open disposition of said nozzle element enabling a force-exerting device to move said screw in a direction toward said nozzle.

4. Molding apparatus comprising a separable mold having a mold cavity, a transfer cylinder, a valve injection nozzle between and in communication with the mold cavity and the transfer cylinder, a screw within said cylinder, a motor means connected to said screw for selectively rotating said screw within said cylinder, a hopper means connected to said cylinder, material from said hopper means being fed by said screw to an accumulation zone adjacent said nozzle, the accumulation of material in said zone causing said screw to reciprocate in a direction away from said nozzle, means for reversing the direction of reciprocation of said screw only in response to said mold being properly closed and said nozzle being open, whereby material in said accumulation zone may be injected through said nozzle into said mold cavity by said screw, and a switch responsive to movement of said screw in a direction toward said nozzle beyond a predetermined point, and means connected to said switch for preventing the closing of the mold on the next cycle.

5. Apparatus in accordance with claim 4 including a safety limit switch, said safety limit switch being disposed so as to be actuated by said screw when said mold fails to close and said nozzle fails to open within a predetermined period of time.

6. Apparatus in accordance with claim 5 wherein said safety limit switch is connected to said motor means, actuation of said safety limit switch causing said motor means to stop, thereby interrupting the rotation and reciprocation of said screw.

7. Apparatus in accordance with claim 4 including a safety limit switch, said switch being activated by said screw when said screw has traveled a predetermined distance in a direction away from said nozzle without the mold being closed and the nozzle being opened, and a third switch between said first mentioned switch and said safety limit switch, said third switch being disposed for actuation by said screw, and means for stopping the closing of the mold in response to a failure of said screw to actuate said third switch.

8. Apparatus in accordance with claim 4 including a timer controlling the opening and closing movement of said mold, a timer controlling the opening and closing movement of said nozzle, and means for causing automatic and repetitive operation.

9. A molding apparatus comprising a separable mold having a mold cavity therein, a transfer cylinder, a valve injection nozzle between and in communication with the mold cavity and the transfer cylinder, means for reciprocating a member in said cylinder in a direction away from said nozzle, means for reversing the direction of reciprocation of said member in response to said mold being properly closed and said nozzle being open, means for halting the reciprocation of said member in response to the failure of said mold to close and said nozzle to open within a predetermined distance of reciprocation of said member in the direction away from said nozzle, and means responsive to opening of the mold for halting the reciprocation of said member in a direction toward said nozzle and reversing the same, and means for automatically and repetitively recycling the member.

10. Apparatus in accordance with claim 9 including means for interrupting said automatic repetitive recycling during the next cycle in response to an insufficient amount of material injected into said cavity.

11. Apparatus in accordance with claim 9 including means for halting the automatic repetitive recycling during the next cycle in response to the movement of said member in a direction toward said nozzle beyond a predetermined point.

References Cited in the file of this patent

UNITED STATES PATENTS

| | | |
|---|---|---|
| 2,389,169 | Stacy | Nov. 20, 1945 |
| 2,408,285 | Ashbaugh | Sept. 24, 1946 |
| 2,505,540 | Goldhard | Apr. 25, 1950 |
| 2,629,132 | Wilcox et al. | Feb. 24, 1953 |
| 2,668,325 | Goodwin | Feb. 9, 1954 |
| 2,680,883 | Ashbaugh | June 15, 1954 |
| 2,734,226 | Wilert | Feb. 14, 1956 |
| 2,916,769 | Baigent | Dec. 15, 1959 |
| 2,923,973 | Ninneman | Feb. 9, 1960 |
| 3,006,032 | Baker et al. | Oct. 31, 1961 |
| 3,014,242 | Baker et al. | Dec. 26, 1961 |
| 3,080,610 | Baigent | Mar. 12, 1963 |